(12) United States Patent
Baek et al.

(10) Patent No.: US 8,920,014 B2
(45) Date of Patent: Dec. 30, 2014

(54) BACKLIGHT UNIT AND DISPLAY APPARATUS HAVING THE SAME

(75) Inventors: Seungin Baek, Seoul (KR); Taek-Sun Shin, Cheonan-si (KR); Rae-Young Kim, Seoul (KR); Jinsung Choi, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 231 days.

(21) Appl. No.: 13/343,300

(22) Filed: Jan. 4, 2012

(65) Prior Publication Data

US 2013/0044507 A1    Feb. 21, 2013

(30) Foreign Application Priority Data

Aug. 18, 2011  (KR) .................. 10-2011-0082297

(51) Int. Cl.
  *F21V 7/04* (2006.01)
  *F21V 7/00* (2006.01)
  *F21V 8/00* (2006.01)
  *F21V 7/05* (2006.01)

(52) U.S. Cl.
  CPC ............... *F21V 7/00* (2013.01); *G02B 6/0011* (2013.01)
  USPC ........... 362/602; 362/615; 362/621; 362/604; 362/606

(58) Field of Classification Search
  CPC .. G02B 6/0055; G02B 6/0036; G02B 6/0018; G02B 6/0031; G02B 6/00; G02B 5/0231; G02F 1/133615; G02F 1/133603
  USPC .................. 362/602, 606–610, 615–629, 362/97.1–97.3; 349/61–63
  See application file for complete search history.

(56) References Cited

U.S. PATENT DOCUMENTS

| | | | | |
|---|---|---|---|---|
| 5,369,415 | A | * 11/1994 | Richard et al. ................ | 345/6 |
| 6,825,987 | B2 | * 11/2004 | Repetto et al. ............... | 359/633 |
| 7,287,892 | B1 | * 10/2007 | Pang et al. .................... | 362/604 |
| 7,334,934 | B2 | * 2/2008 | Feng et al. .................... | 362/626 |
| 7,645,048 | B2 | * 1/2010 | Iwasaki et al. ................ | 362/84 |
| 2012/0026429 | A1 | * 2/2012 | Chen et al. .................... | 349/65 |

FOREIGN PATENT DOCUMENTS

| | | |
|---|---|---|
| JP | 2003121840 A | 4/2003 |
| JP | 2007141596 A | 6/2007 |
| JP | 2008071696 A | 3/2008 |

* cited by examiner

*Primary Examiner* — Karabi Guharay
*Assistant Examiner* — Nathaniel Lee
(74) *Attorney, Agent, or Firm* — Cantor Colburn LLP

(57) ABSTRACT

A backlight unit includes a light guide plate and a light source unit. The light guide plate includes an exit surface which has a polygonal shape, a lower surface which faces the exit surface, and side surfaces which connect the exit surface and the lower surface. The light guide plate guides a light such that that light exits from the exit surface. The light source unit includes a plurality of light sources which provide the light to the light guide plate. The light guide plate includes a protrusion which protrudes from an end of the lower surface in a direction opposite to the exit surface. The protrusion includes a first inclination surface which is connected to one of the side surfaces, and a second inclination surface which connects the first inclination surface and the lower surface to each other.

19 Claims, 5 Drawing Sheets

BACKLIGHT UNIT AND DISPLAY APPARATUS HAVING THE SAME

This application claim priority to Korean Patent Application No. 10-2011-0082297 filed on Aug. 18, 2011, and all the benefits accruing therefrom under 35 U.S.C. §119, the contents of which are herein incorporated by reference in its entirety.

BACKGROUND OF THE INVENTION

1. Field of the Invention

The invention relates to a backlight unit and a display apparatus. More particularly, the invention relates to a backlight unit having improved light efficiency and a display apparatus having the backlight unit.

2. Description of the Related Art

In general, a display apparatus employing a liquid crystal display panel or an electrophoretic display panel as its display panel is not a self-emissive device, so the display apparatus requires a backlight unit to provide light to the display panel thereof.

The backlight unit includes a light guide plate guiding the light to the display panel and a light source emitting the light to the light guide plate. As the light source, a light emitting diode is extensively used.

A structure allowing the display apparatus to be slimmed has been researched and developed. However, there is a limitation in reducing a size of the light emitting diode when compared to the reduction of the thickness of the light guide plate. Accordingly, the light emitted from the light emitting diode is partially leaked without being incident to the light guide plate.

BRIEF SUMMARY OF THE INVENTION

Exemplary embodiments of the invention provide a backlight unit capable of improving a light efficiency.

Exemplary embodiments of the invention provide a display apparatus having the backlight unit.

According to the exemplary embodiments, a backlight unit includes a light guide plate and a light source unit. The light guide plate includes an exit surface which has a polygonal shape, a lower surface which faces the exit surface, and side surfaces which connect the exit surface and the lower surface. The light guide plate guides a light such that the light exits from the exit surface. The light source unit includes a plurality of light sources which provide the light to the light guide plate. The light guide plate includes a protrusion which protrudes from an end of the lower surface in a direction opposite to the exit surface. The protrusion includes a first inclination surface which is connected to one of the side surfaces, and a second inclination surface which connects the first inclination surface and the lower surface to each other.

An angle between the first inclination surface and a surface substantially perpendicular to the lower surface of the light guide plate is equal to or greater than a critical angle of the light guide plate.

The backlight unit further includes a reflective member which overlaps a portion of the exit surface, which corresponds to the protrusion.

According to the exemplary embodiments, a display apparatus includes a light guide plate, a light source unit and a display panel. The light guide plate includes an exit surface which has a polygonal shape, a lower surface which faces the exit surface, and side surfaces which connect the exit surface and the lower surface. The light guide plate guides a light such that the light exits from the exit surface. The light source unit includes a plurality of light sources which provide the light to the light guide plate. The display panel receives the light exiting from the light guide plate and displays an image. The light guide plate includes a protrusion which protrudes from an end of the lower surface in a direction opposite to the exit surface. The protrusion includes a first inclination surface which is connected to one of the side surfaces, and a second inclination surface which connects the first inclination surface and the lower surface to each other.

According to the above, the reflective member reflects the light emitted from the light source to the light guide plate, which is not directed to the display panel, and thus the light efficiency in the display apparatus employing the light guide plate may be improved and the volume of the display apparatus may be reduced.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION OF THE INVENTION

Figure 1:
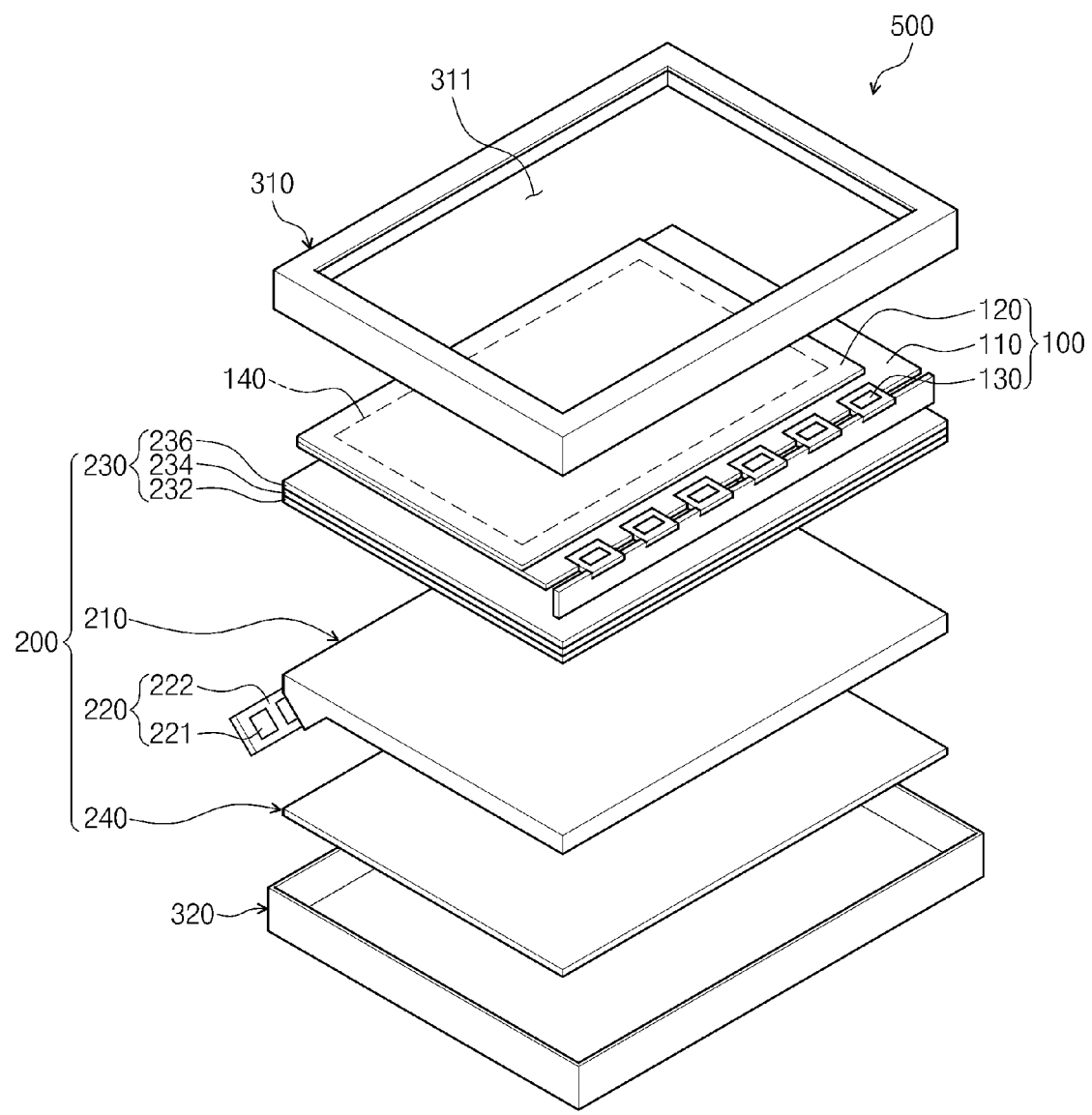
FIG. 1 is an exploded perspective view showing an exemplary embodiment of a display apparatus according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
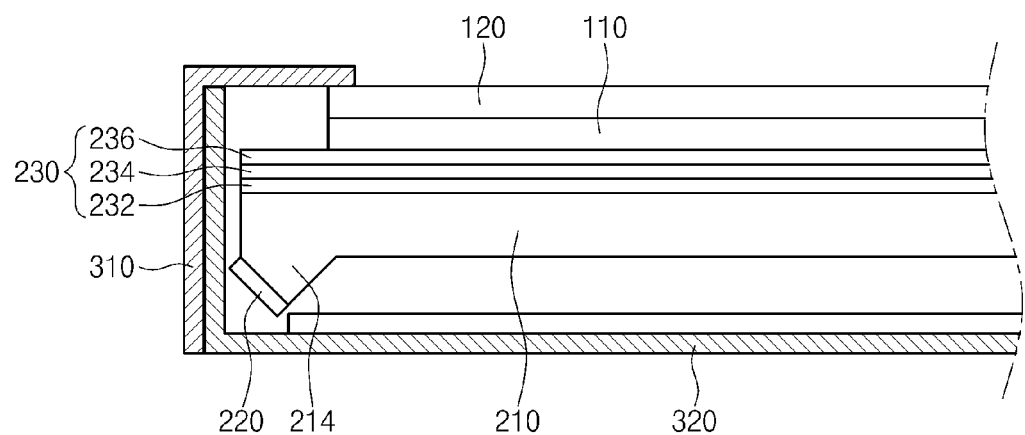
FIG. 2 is a cross-sectional view showing the display apparatus shown in FIG. 1.

FIG. 1 is an exploded perspective view showing an exemplary embodiment of a display apparatus according to the invention, and FIG. 2 is a cross-sectional view showing the display apparatus shown in FIG. 1.

Referring to FIGS. 1 and 2, a display apparatus 500 includes a display panel 100, a backlight unit 200, an upper cover 310 and a lower cover 320.

The display panel 100 may be various display panels, such as a liquid crystal display panel, an electrophoretic display panel, etc. In the illustrated exemplary embodiment, the liquid crystal display panel will be described as the display panel 100.

The display panel 100 has a rectangular plate shape having a long side and a short side. The display panel 100 includes an array substrate 110, an opposite substrate 120 facing the array substrate 110, and a liquid crystal layer (not shown) disposed between the array substrate 110 and the opposite substrate 120.

The array substrate 110 includes a plurality of pixels (not shown) disposed thereon in a matrix form. In an exemplary embodiment, each pixel includes a pixel electrode (not shown), a gate line (not shown), a data line (not shown), and a thin film transistor (not shown) electrically connected to the pixel electrode. The gate line is disposed adjacent to the pixel electrode and extended in a first direction substantially parallel to a side of the array substrate 110. The data line is extended in a second direction substantially perpendicular to the first direction and insulated from the gate line while crossing the gate line. The thin film transistor switches a driving signal applied to a corresponding pixel electrode among the pixels. In addition, a driver integrated circuit ("IC") 130 may be disposed on the array substrate 110. The driver IC 130 receives various signals and outputs a driving signal in response to control signals applied thereto to drive the display panel 100.

The opposite substrate 120 includes red, green and blue ("RGB") color filters (not shown) that display a predetermined color, and a common electrode (not shown) disposed on the RGB color filters to face the pixel electrode. The RGB color filters may be formed by a thin film process. In the illustrated exemplary embodiment, the RGB color filters are disposed on the opposite substrate 120, but they should not be limited thereto or thereby. That is, in an alternative exemplary embodiment, the RGB color filters may be disposed on the array substrate 110.

The liquid crystal layer includes liquid crystal molecules aligned in a specific direction by voltages applied to the pixel electrode and the common electrode to control a light transmittance of the light passing through the liquid crystal layer, thereby displaying desired images on the display panel 100.

The backlight unit 200 is disposed under and overlapping the display panel 100 in a plan view of the display apparatus 500. The backlight unit 200 includes a light guide plate 210, a light source unit 220, an optical member 230 and a reflective sheet 240.

The light guide plate 210 is disposed under the display panel 100 and guides the light emitted from the light source unit 220 to the display panel 100. The light guide plate 210 includes at least one protrusion 214 protruded from a lower surface thereof opposite to an upper surface thereof from which the light incident to the light guide plate 210 exits.

The light source unit 220 is disposed adjacent to the protrusion 214 and provides the light to the light guide plate 210. In the illustrated exemplary embodiment, the light source unit 220 may include a printed circuit board 222, and a plurality of light sources 221 mounted on a printed circuit board 222. Each of the light sources 221 may be a light emitting diode.

The optical member 230 is disposed between the light guide plate 210 and the display panel 100. The optical member 230 optically controls the light from the light source unit 220. The optical member 230 includes a diffusion sheet 232, a prism sheet 234 and a protective sheet 236, which are sequentially stacked on the light guide plate 210.

The diffusion sheet 232 diffuses the light provided from the light source unit 220 through the light guide plate 210 and the prism sheet 234 condenses the light, which is diffused by the diffusion sheet 232, in a direction substantially vertical to the surface of the display panel 100. The light exiting through the prism sheet 234 is vertically incident into the display panel 100. The protective sheet 236 is disposed on the prism sheet 234 to protect the prism sheet 234 from external impacts.

In the illustrated exemplary embodiment, the optical member 230 includes one each of the diffusion sheet 232, the prism sheet 234, and the protective sheet 236, but it should not be limited thereto or thereby. In other words, at least one of the diffusion sheet 232, the prism sheet 234, or the protective sheet 236 included in the optical member 230 may be provided in a plural number, or one of the diffusion sheet 232, the prism sheet 234, and the protective sheet 236 may be omitted. In one exemplary embodiment, for instance, the prism sheet 234 may be provided as two sheets stacked one on another.

The reflective sheet 240 is disposed under the light guide plate 210 to reflect the light leaked from the light guide plate 210, to thereby directing the light to the display panel 100. The reflective sheet 240 includes a material reflecting the light. The reflective sheet 240 is disposed on the lower cover 320 to reflect the light from the light source unit 220, so that an amount of the light provided to the display panel 100 may be enhanced. The upper cover 310 is disposed on the display 100 and provided with a window 311 extended through a thickness of an upper portion thereof, to expose a display area 140 of the display panel 100. The upper cover 310 includes an upper surface to support a front surface of the display panel 100, and a plurality of side surfaces downwardly extended from the upper surface thereof. In this case, since the display panel 100 has the rectangular plate shape, the upper cover 310 may include four side surfaces. The upper cover 310 is coupled with the lower cover 320 to support the front surface of the display panel 100.

The lower cover 320 is disposed under the backlight unit 200. The lower cover 320 includes a bottom surface corresponding to the display panel 100 and the backlight unit 200, and a plurality side surfaces upwardly extended from the bottom surface. Since the display panel 100 has the rectangular plate shape similar to the upper cover 310, the lower cover 320 may include four side surfaces. The lower cover 320 provides a receiving space defined by the bottom surface and the side surfaces to accommodate the display panel 100 and the backlight unit 200. In addition, the lower cover 320 is coupled with the upper cover 310 to support the display panel 100 and the backlight unit 200 accommodated in the receiving space.

Figure 3A:
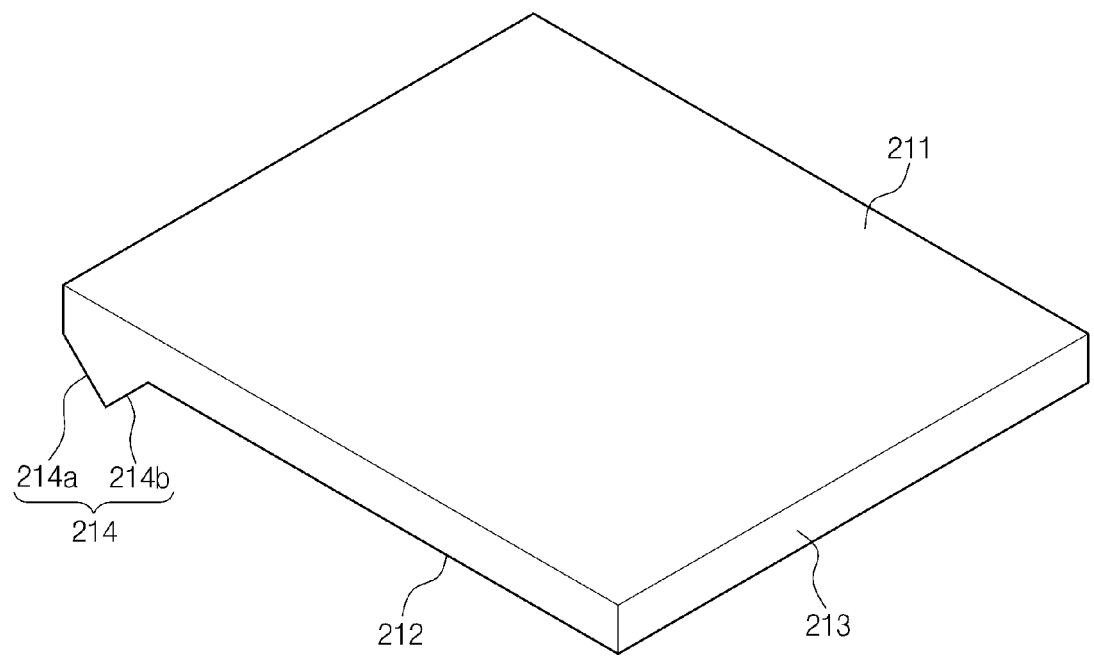
FIGS. 3A and 3B are perspective views showing an exemplary embodiment of a light guide plate shown in FIGS. 1 and 2.
Figure 3B:
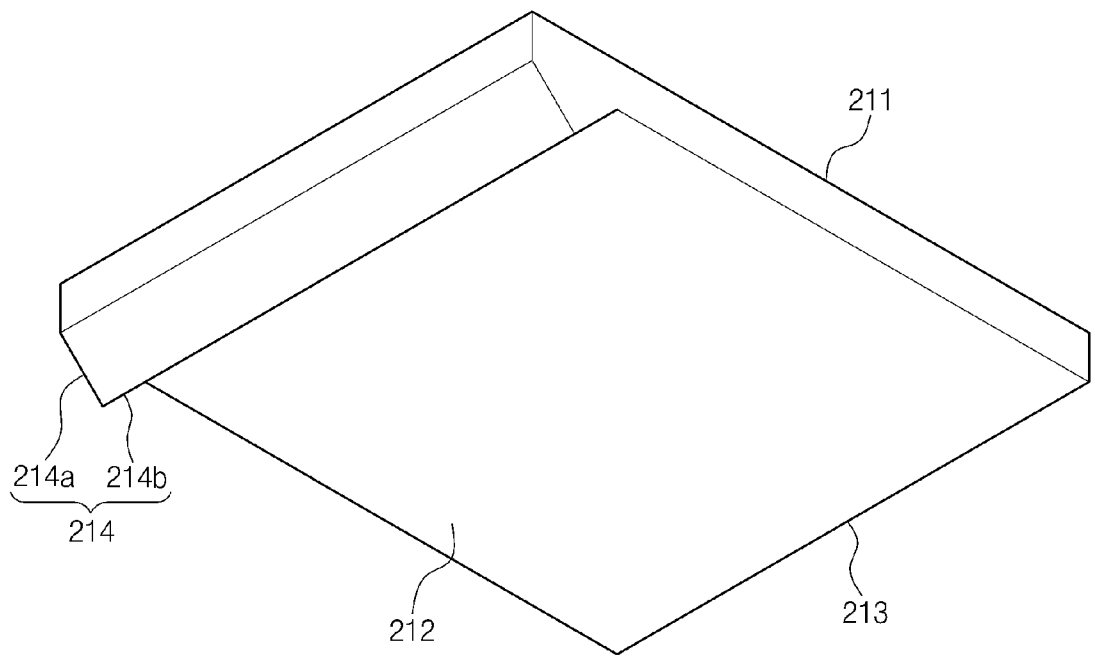
Figure 4:
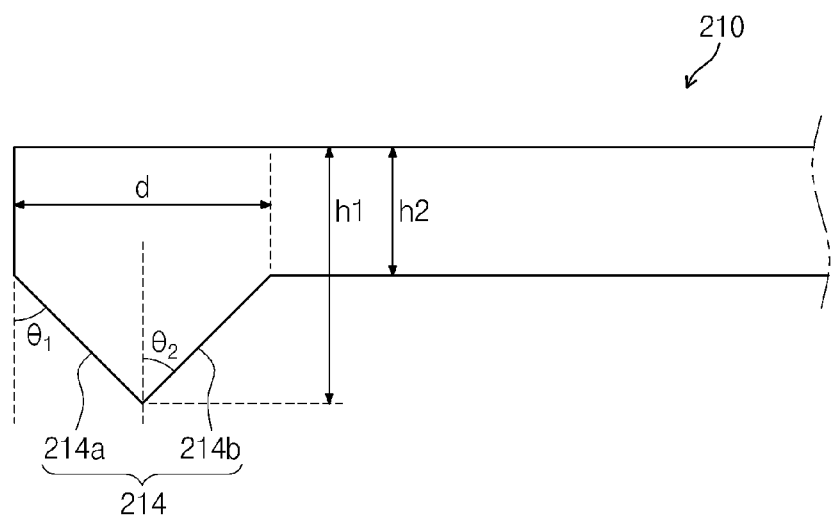
FIG. 4 is a cross-sectional view showing a portion of the light guide plate shown in FIG. 3.

FIGS. 3A and 3B are perspective views showing an exemplary embodiment of a light guide plate shown in FIGS. 1 and 2, and FIG. 4 is a cross-sectional view showing a portion of the light guide plate shown in FIG. 3. In detail, FIG. 3A is an upper perspective view and FIG. 3B is a lower perspective view.

Referring to FIGS. 3A, 3B, and 4, the light guide plate 210 includes an exit surface 211 having a polygonal shape, a lower surface 212 facing the exit surface 211, and a plurality of side surface 213 connecting the exit surface 211 and the lower surface 212. In the illustrated exemplary embodiment, the light guide plate 210 including the exit surface 211 having a quadrangular shape and four side surfaces 213 will be described as a representative example.

In addition, the light guide plate 210 includes at least one protrusion 214 protruded from an end of the lower surface 212 in a direction opposite to the exit surface 211. The protrusion 214 is disposed between two first side surfaces 213 which face each other and parallel to each other, and is longitudinally extended in a direction substantially perpendicular to the two first facing and parallel side surfaces 213. As shown in FIG. 3B, the protrusion 214 may extend an entire length between the two first facing and parallel side surfaces 213.

Further, the protrusion 214 includes a first inclination surface 214a connected to and extending directly from a side surface 213 among remaining two second side surfaces 213 except for the two first side surfaces 213 respectively corresponding to both ends of the protrusion 214, and a second inclination surface 214b connecting the first inclination surface 214a and the lower surface 212 of the light guide plate 210. The light source unit 220 may be disposed on the first inclination surface 214a.

An angle θ between the first inclination surface 214a and a surface substantially vertical (e.g., perpendicular) to the lower surface 212 may be equal to or greater than a critical angle of the light guide plate 210. Thus, the angle θ between the first inclination surface 214a and the surface substantially vertical to the lower surface 212 satisfies the following Equation 1.

$$\theta \geq \sin^{-1}\left(\frac{1}{n}\right) \quad \text{Equation 1}$$

In Equation 1, "n" denotes a refractive index of the light guide plate 210.

In addition, since the light guide plate 210 includes a polyethylene terephthalate ("PET") based material, the critical angle θ is about 41.8 degrees. Accordingly, the angle θ between the first inclination surface 214a and the surface substantially vertical to the lower surface 212 is equal to or greater than about 41.8 degrees.

Further, an angle between the second inclination surface 214b and the surface substantially vertical to the lower surface 212 is equal to or greater than the angle θ between the first inclination surface 214a and the surface substantially vertical to the lower surface 212.

When assuming that a shortest distance between the exit surface 211 and a point at which the first inclination surface 214a meets the second inclination surface 214b is referred to as "h1", a shortest distance between the exit surface 211 and the lower surface 212 is referred to as "h2", and a shortest distance between the lower surface 212 and an imaginary line extended from the point, at which the first inclination surface 214a meets the second inclination surface 214b, to be parallel to the lower surface 212 is referred to as "h3", a shortest distance "d" between a point at which the first inclination surface 214a meets one of the four side surfaces 213 and a point at which the second inclination surface 214b meets the lower surface 212 satisfies the following Equation 2.

$$d \geq \frac{h1}{\tan\theta_1} + \frac{h2}{\tan\theta_2} \quad \text{Equation 2}$$

In Equation 2, $\theta_1$ denotes the angle between the first inclination surface 214a and the surface substantially vertical to the lower surface 212 and $\theta_2$ denotes an angle between the second inclination surface 214b and the surface substantially vertical to the lower surface 212.

According to the above-mentioned display apparatus 500, the light guide plate 210 includes the protrusion 214 provided with the first inclination surface 214a to which the light source unit 220 is attached. Thus, although the size of the light source 221 increases, it is not required to increase the thickness of the light guide plate 210, thereby reducing a volume of the display apparatus 500.

Figure 5:
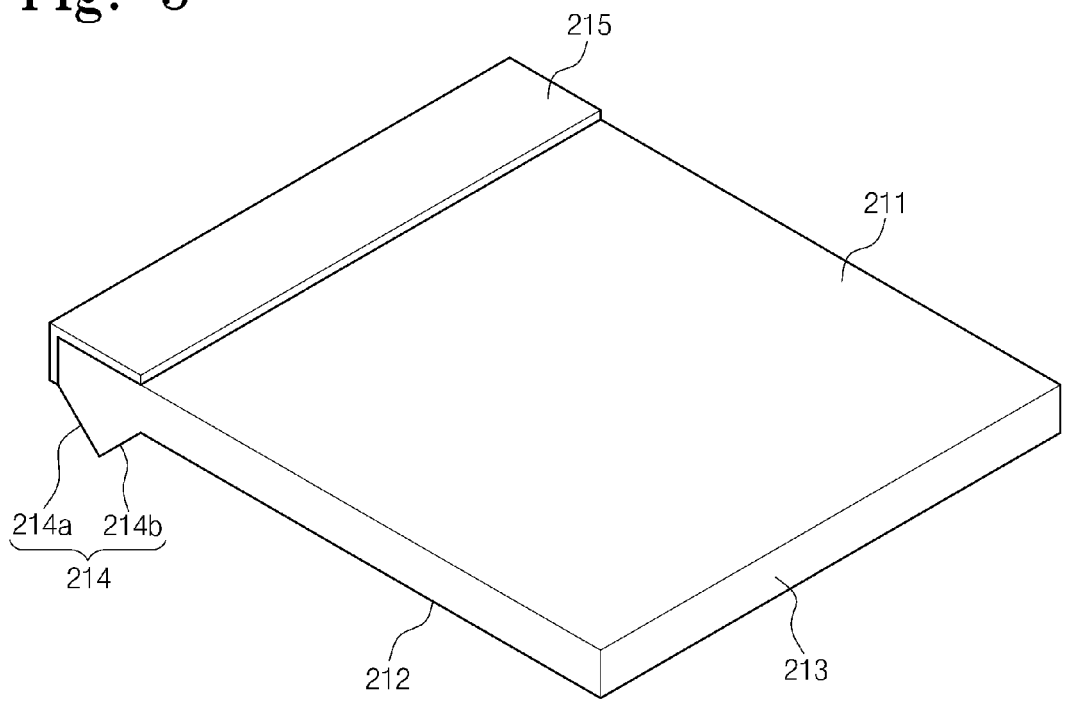
FIG. 5 is a perspective view showing another exemplary embodiment of a light guide plate in a display apparatus according to the invention.
Figure 6:
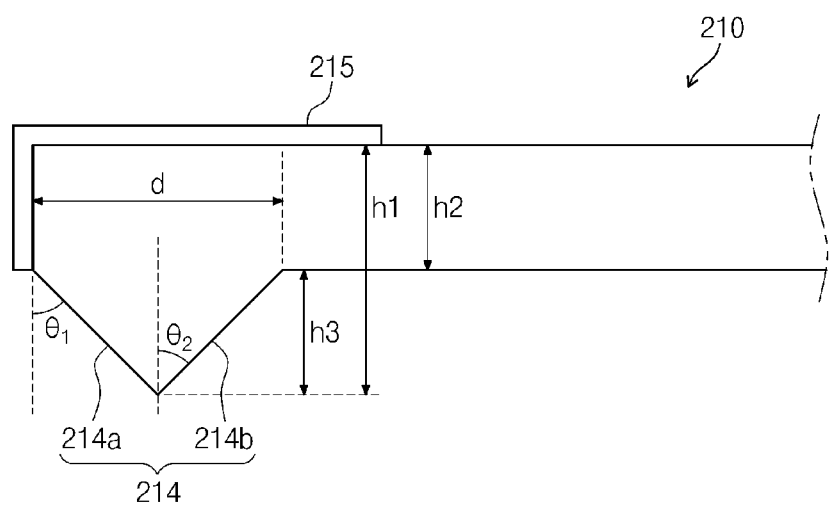
FIG. 6 is a cross-sectional view showing a portion of the light guide plate shown in FIG. 5.
Figure 7:
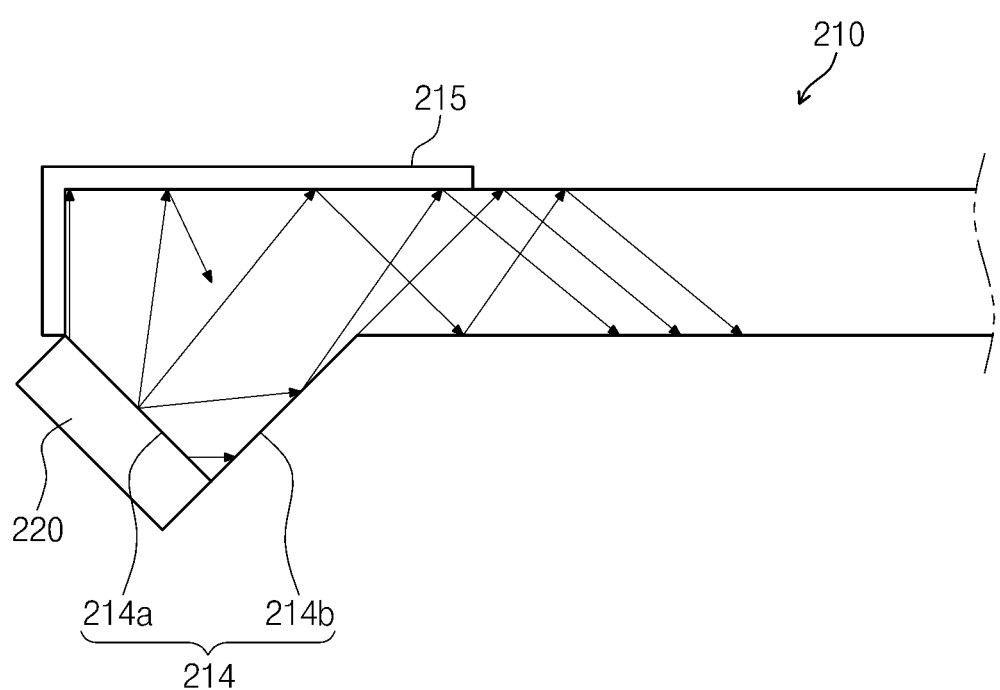
FIG. 7 is a view showing an optical path in the light guide plate shown in FIG. 5.

FIG. 5 is a perspective view showing another exemplary embodiment of a light guide plate in a display apparatus according to the invention, FIG. 6 is a cross-sectional view showing a portion of the light guide plate shown in FIG. 5, and FIG. 7 is a view showing an optical path in the light guide plate shown in FIG. 5. In FIGS. 5 to 7, the same reference numerals denote the same elements in FIGS. 1 to 4, and thus detailed descriptions of the same elements will be omitted.

Referring to FIGS. 5 to 7, the light guide plate 210 further includes a reflective member 215 to cover a portion of the light guide plate 210. The reflective member 215 may include a metal material having a superior reflectivity to reflect the light emitted from the light source 221.

In addition, the reflective member 215 covers a portion of the exit surface 211, which corresponds to (e.g., overlaps) the protrusion 214, and the side surface 213 of the four side surfaces 213, which meets the first inclination surface 214a of the protrusion 214. As illustrated in FIGS. 6 and 7, the reflective member 215 may overlap an entire of the side surface 213 meeting the first inclination surface 214a.

In the illustrated exemplary embodiment, the reflective member 215 covers at least the portion of the exit surface 211, which corresponds to the protrusion 214. In addition, the reflective member 215 may cover the side surface 213 of the four side surfaces 213, which meets the first inclination surface 214a of the protrusion 214, but the invention is not limited thereto.

The reflective member 215 reflects the light emitted from the light source 221 to the light guide plate 210, which is not directed to the display panel 100, and thus the light efficiency in the display apparatus 500 employing the light guide plate 210 as described above may be improved.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A backlight unit comprising:
   a light guide plate including an exit surface which has a polygonal shape, a lower surface which faces the exit surface, and side surfaces which connect the exit surface and the lower surface, wherein the light guide plate guides a light such that the light exits from the exit surface; and
   a light source unit including a plurality of light sources which provide the light to the light guide plate,
   wherein
   the light guide plate further includes a protrusion which protrudes from an end of the lower surface in a direction opposite to the exit surface, and
   the protrusion comprises a first inclination surface which extends directly from a side surface of the light guide plate nearest the light source unit, and a second inclination surface which connects the first inclination surface and the lower surface to each other.

2. The backlight unit of claim 1, wherein the protrusion is between two side surfaces parallel to each other among the side surfaces, and longitudinally extends in a direction substantially perpendicular to the two parallel side surfaces.

3. The backlight unit of claim 1, wherein the light source unit is on the first inclination surface.

4. The backlight unit of claim 3, wherein an angle between the first inclination surface and a surface substantially perpendicular to the lower surface of the light guide plate is equal to or greater than a critical angle of the light guide plate.

5. The backlight unit of claim 4, wherein
the angle between the first inclination surface and the surface substantially perpendicular to the lower surface of the light guide plate satisfies an equation $$\theta \geq \sin^{-1}\left(\frac{1}{n}\right),$$

where $\theta$ denotes the angle between the first inclination surface and the surface substantially perpendicular to the lower surface of the light guide plate and n denotes a refractive index of the light guide plate.

6. The backlight unit of claim 4, wherein an angle between the second inclination surface and the surface substantially perpendicular to the lower surface of the light guide plate is equal to or greater than the angle between the first inclination surface and the surface substantially perpendicular to the lower surface of the light guide plate.

7. The backlight unit of claim 1, wherein
a distance (d) between a point at which the first inclination surface meets one of the side surfaces and a point at which the second inclination surface meets the lower surface satisfies an equation $$d \geq \frac{h1}{\tan\theta_1} + \frac{h2}{\tan\theta_2},$$

where $\theta_1$ denotes an angle between the first inclination surface and a surface substantially perpendicular to the lower surface, $\theta_2$ denotes an angle between the second inclination surface and the surface substantially perpendicular to the lower surface, h1 denotes a shortest distance between the exit surface and a point at which the first inclination surface meets the second inclination surface, and h2 denotes a shortest distance between the exit surface and the lower surface.

8. The backlight unit of claim 1, further comprising a reflective member which overlaps a portion of the exit surface, which overlaps the protrusion.

9. The backlight unit of claim 8, wherein the reflective member further overlaps one of the side surfaces, which meets the first inclination surface.

10. A display apparatus comprising:
    a light guide plate including an exit surface which has a polygonal shape, a lower surface which faces the exit surface, and side surfaces which connect the exit surface and the lower surface, wherein the light guide plate guides a light such that the light exits from the exit surface;
    a light source unit including a plurality of light sources which provide the light to the light guide plate; and
    a display panel which receives the light which exits from the light guide plate, and displays an image,
    wherein the light guide plate further includes a protrusion which
protrudes from an end of the lower surface in a direction
opposite to the exit surface, and the protrusion comprises a first inclination surface which
extends directly from a side surface of the light guide
plate nearest the light source unit, and a second inclination surface which connects the first inclination surface
and the lower surface to each other.

11. The display apparatus of claim 10, wherein the protrusion is between two side surfaces parallel to each other among the side surfaces, and longitudinally extends in a direction substantially perpendicular to the two parallel side surfaces.

12. The display apparatus of claim 10, wherein the light source unit is on the first inclination surface.

13. The display apparatus of claim 12, wherein an angle between the first inclination surface and a surface substantially perpendicular to the lower surface of the light guide plate is equal to or greater than a critical angle of the light guide plate.

14. The display apparatus of claim 13, wherein
the angle between the first inclination surface and the surface substantially perpendicular to the lower surface of the light guide plate satisfies an equation $$\theta \geq \sin^{-1}\left(\frac{1}{n}\right),$$

where $\theta$ denotes the angle between the first inclination surface and the surface substantially perpendicular to the lower surface of the light guide plate and n denotes a refractive index of the light guide plate.

15. The display apparatus of claim 13, wherein an angle between the second inclination surface and the surface substantially perpendicular to the lower surface of the light guide plate is equal to or greater than the angle between the first inclination surface and the surface substantially perpendicular to the lower surface of the light guide plate.

16. The display apparatus of claim 10, wherein
a distance (d) between a point at which the first inclination surface meets one of the side surfaces and a point at which the second inclination surface meets the lower surface satisfies an equation $$d \geq \frac{h1}{\tan\theta_1} + \frac{h2}{\tan\theta_2},$$

where $\theta_1$ denotes an angle between the first inclination surface and a surface substantially perpendicular to the lower surface, $\theta_2$ denotes an angle between the second inclination surface and the surface substantially perpendicular to the lower surface, h1 denotes a shortest distance between the exit surface and a point at which the first inclination surface meets the second inclination surface, and h2 denotes a shortest distance between the exit surface and the lower surface.

17. The display apparatus of claim 10, further comprising a reflective member which overlaps a portion of the exit surface, which overlaps to the protrusion.

18. The display apparatus of claim 17, wherein the reflective member further overlaps one of the side surfaces, which meets the first inclination surface.

19. A method of forming a backlight unit, the method comprising:

forming a base of a light guide plate, the base including an exit surface which has a polygonal shape, a lower surface which faces the exit surface, and side surfaces which connect the exit surface and the lower surface to each other;

forming a protrusion of the light guide plate, wherein the protrusion protrudes from the lower surface of the base in a direction away from the exit surface and comprises:
a first inclined surface which extends directly from one of the side surfaces, and
a second inclined surface which connects the first inclined surface and the lower surface to each other; and disposing a light source unit including a plurality of light sources which provide the light to the light guide plate, facing the first inclined surface of the protrusion, wherein the first inclined surface extends directly from a side surface of the light guide plate nearest the light source unit.

* * * * *